Jan. 9, 1934.  C. A. MARIEN  1,942,967
PISTON PACKING RING
Filed July 21, 1933
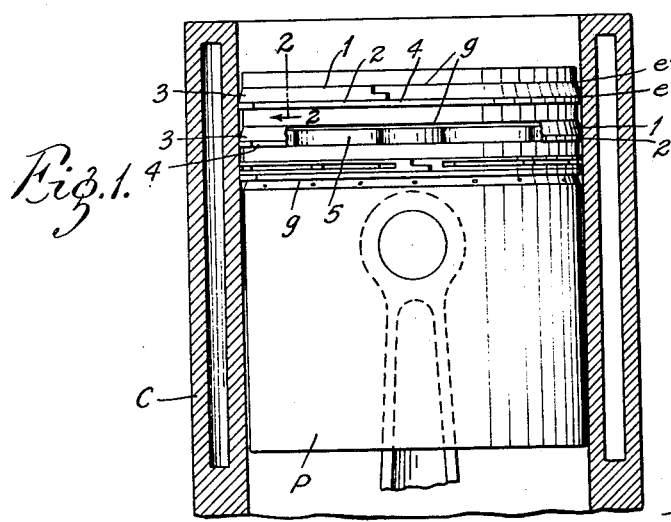
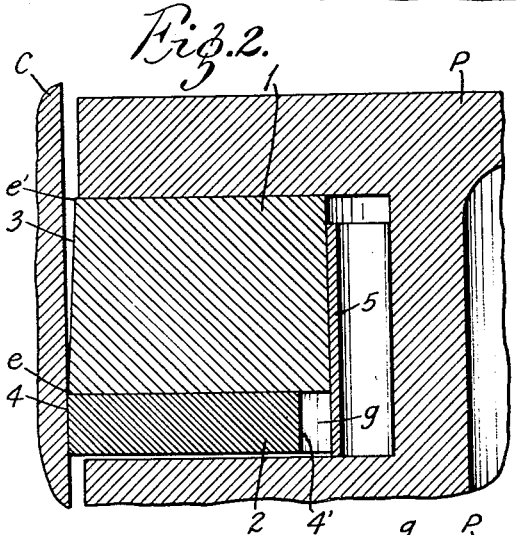
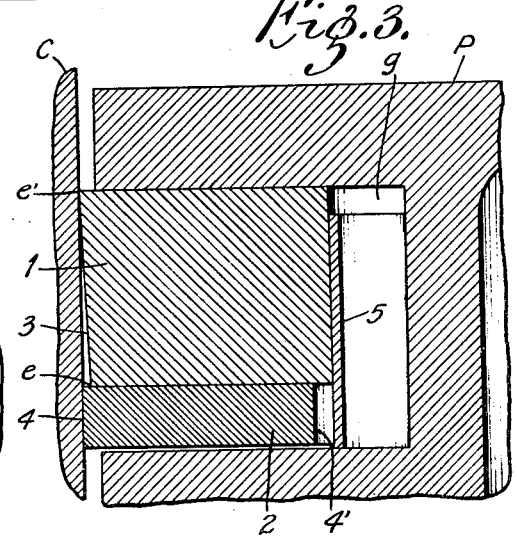
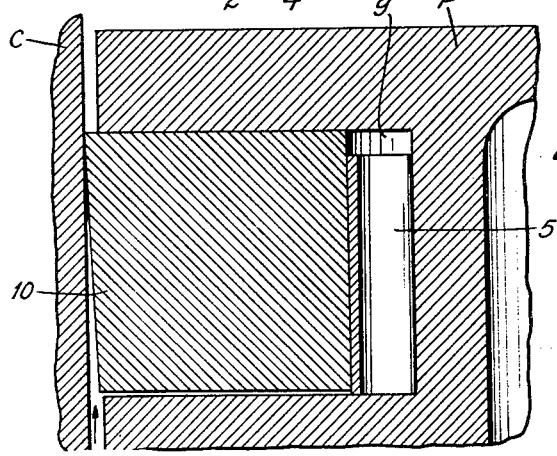
INVENTOR:
CHARLES A. MARIEN.
BY Harry A. Berner
ATTORNEY.

Patented Jan. 9, 1934

1,942,967

UNITED STATES PATENT OFFICE 1,942,967

PISTON PACKING RING

Charles A. Marien, St. Louis, Mo., assignor to Ramsey Accessories Manufacturing Corporation, St. Louis, Mo., a corporation of Missouri Application July 21, 1933. Serial No. 681,407

4 Claims. (Cl. 309—29)

My invention has relation to improvements in piston packing rings and it consists in the novel features of construction more fully set forth in the specification and pointed out in the claims.

It is a matter of common knowledge among automobile mechanics that engine cylinders become tapered in use so that they are wider at the top than at the bottom and after a piston operates for a time in a tapered cylinder the piston rings also become tapered so that the faces of the rings incline away from the cylinder wall at the lower part thereof and permit passage of oil past the ring into the combustion chamber. Sometimes the pistons become so loose in the cylinders that they rock and wear the rings more or less barrel-shaped. When the rings become thus worn they lose their efficiency as excess oil accumulations build up between the face of the ring and the cylinder wall and produce a hydraulic action which unseats the ring and allows an excessive amount of oil to flow past it. This unseating of the ring also breaks the piston ring seal and reduces the compression in the cylinder. I have found by inspection of many pistons and piston rings that it is common for rings to have as much as .002" taper after having been in use for a comparatively short time. That is, there is .002" clearance between the bottom edge of the ring and the cylinder wall. Attempts have been made to correct this evil by initially tapering the face of the ring in the opposite direction, but this at best only slightly prolongs the useful service of the ring as this initial taper is soon worn off and the ring begins to taper in the opposite direction.

It is the object of the present invention to provide a piston packing that is not susceptible to the defects just mentioned. I accomplish this object by providing a piston ring of the usual construction, although having a somewhat narrower face, and associated with said ring is a ring element which is placed in the piston ring groove adjacent to the packing ring, said element being comparatively thin and consisting of a material that is harder than a cast-iron packing ring, such as tempered steel. This tempered steel ring element, or washer as it may be called. being of hardened material will not wear so as to acquire a tapered face, and having an inherently high spring tension it will at all times closely hug the cylinder wall; and, even though the packing ring face becomes tapered in use, the steel ring will prevent accumulations of oil against its face to set up a hydraulic pressure such as above alluded to. Therefore, by my combination, the packing ring at all times retains its seat against the cylinder wall and preserves the seal to hold the compression in the cylinder. These advantages, as well as others inherent in the invention, will be better apparent from a detailed description thereof in connection with the accompanying drawing, in which:

Figure 1 is a side elevation of a piston equipped with my improved piston packing; Fig. 2 is an enlarged cross-sectional view taken on the line 2—2 of Fig. 1 showing the ring combination in the condition as it is originally installed in the piston; Fig. 3 is a similar section to that shown in Fig. 2 showing the piston packing after the same has been somewhat worn by use; and Fig. 4 is a similar section showing the old style of piston ring with the face worn tapered by use.

Referring to the drawing, P represents an engine piston of the usual construction operable in an engine cylinder C. The piston is provided with a plurality of piston ring grooves $g, g, g$ in which is disposed my improved piston packing comprising a piston packing ring 1 and a thin ring element or washer 2. Ordinarily the piston packing ring 1 fills the piston ring groove $g$ except for such clearance at the sides of the groove as is necessary to permit the packing ring to expand and contract in operation. Under the construction of the packing, according to my invention, the piston ring 1 and the ring element 2 operate in juxtaposed position and their combined width equals that of the ordinary one-piece piston ring. However, the piston ring 1 is approximately three times the width of the ring element 2. For instance, if the combined width of ring 1 and element 2 is .124" the width of the ring element 2 is .030", or about one-fourth of the width of the assembled packing. The packing ring 1 is constructed in the usual manner of cast-iron and is preferably provided with an initially tapered face 3 so that the diameter of the lower edge $e$ is slightly greater (approximately .004") than the diameter of the upper edge $e'$. The ring element 2 is seated in the groove $g$ adjacent to the side thereof farthest from the head of the piston and its narrow working face 4 is preferably square so as to fully contact with the cylinder wall. The ring element 2 is formed of tempered steel so that it is somewhat harder than the ring 1 and the cylinder wall, and at the same time possesses a greater amount of inherent tension or springiness than the ring 1. The greater amount of tension in the ring element 2 makes the element more lively than the ring 1 so that it will act independently of the ring 1 in maintaining contact with the cylinder wall during the reciprocations of the piston and its tension need not be augmented as does that of the ring 1 by an inner spring ring 5. The spring ring 5 is of the usual polygonal shape and operates to increase the pressure with which the ring 1 bears against the cylinder in the same manner that inner rings operate which are now in common use with one-piece piston rings. In order that the ring element 2 may be free to operate solely by virtue of its inherent tension its depth, that is radial dimension, from its working face 4 to inner face 4' is somewhat less than that of the depth of the piston ring 1. Thus the inner ring 5 will at no time contact with the ring element 2.

When a piston equipped with my improved packing ring is in operation the cast-iron piston ring 1 will of course wear on its face in the same manner that rings now in use wear so that ultimately the taper of the working face 3 will be reversed, as above explained, and the lower edge e of the ring will move away from the cylinder wall and leave a clearance space through which oil may pass. However, there will be practically no wear on the working face 4 of the ring element 2 because this element is of harder metal than the cylinder. Therefore, an oil seal will be maintained between the ring element 2 and the cylinder so that oil will not be able to enter between the face 3 of ring 1 and the cylinder. Thus, the ring 1 will always remain in contact with the cylinder under the pressure imposed on it by the inner ring 5 and it will at all times function to serve as a compression seal.

The steel ring element 2 is not only subjected to very slight wear but retains its spring characteristics, although subjected to high stresses and high temperature. Furthermore, although its high tension produces a high unit pressure against the cylinder wall, the narrow width of the face 4 insures a low total wall pressure so that the danger of scoring the cylinder wall by the continual sliding contact of the hard ring element 2 is practically nil. On the other hand the high unit pressure will keep the ring element in close contact with the cylinder so that it will penetrate the oil film and prevent the passage of oil beyond the ring. The main pressure for supporting and stabilizing the piston in the cylinder is exerted by the piston ring 1 and therefore any particles of carbon or grit that might work in between the face 4 of ring element 2 and the cylinder will not necessarily score the cylinder but instead will work past the narrow face 4 to be absorbed by the cast-iron ring 1.

It will be observed by comparing Figs. 2 and 4 how the ring element 2 operates to prevent oil from working past the face 3 of ring 1. In Fig. 3 the ring element 2 blocks the entrance to the passageway between the ring 1 and cylinder, whereas in the old style of one-piece ring 10 the oil may freely pass between the ring and the cylinder on the down stroke of the piston.

When the ring 1 is new the force of the compressed gases sometimes causes loss of compression by the escape of the gases past the tapered face of ring 1. The close association of ring 2 prevents this loss of compression or "blow-by" as termed by shop men. After the taper on the ring 1 is reversed by wear the tendency for "blow-by" is reduced and the ring 2 becomes doubly effective to prevent such loss of compression.

Having described my invention, I claim:

1. A piston packing comprising a split expansible cast iron piston ring having a conical working face inclining outwardly from the upper margin of the ring, and an expansible ring element of spring steel and substantially thinner than the piston ring disposed in contacting relation with the lower margin of the ring, said ring element being of less radial depth than the piston ring.

2. A piston packing comprising a split expansible cast iron piston ring, and an expansible ring element of spring steel substantially thinner than the piston ring disposed in contacting relation with the lower margin of the ring, said ring element being of less radial depth than the piston ring.

3. A piston packing comprising a split expansible cast iron piston ring having a conical working face inclining outwardly from the upper margin of the ring, an expansible ring element of spring steel substantially thinner than the piston ring disposed in contacting relation with the lower margin of the ring, and an inner spring ring disposed in the piston ring groove in contacting relation with the piston ring and in non-contacting relation with the expansible ring element.

4. A piston packing comprising a split expansible cast iron piston ring and an expansible ring element of spring steel disposed in contacting relation with the lower margin of the ring, said ring element being of less radial depth than the piston ring and not more than one-third the axial width of said ring.

CHARLES A. MARIEN.